US012024104B2

(12) United States Patent
Gustafson et al.

(10) Patent No.: US 12,024,104 B2
(45) Date of Patent: Jul. 2, 2024

(54) VEHICLE ADAPTIVE AUTOMATIC LUBRICATION

(71) Applicant: Graco Minnesota Inc., Minneapolis, MN (US)

(72) Inventors: Brandon T. Gustafson, Wayzata, MN (US); Daniel M. Jensen, Vadnais Heights, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 926 days.

(21) Appl. No.: 16/345,584

(22) PCT Filed: Nov. 1, 2017

(86) PCT No.: PCT/US2017/059477
§ 371 (c)(1),
(2) Date: Apr. 26, 2019

(87) PCT Pub. No.: WO2018/085355
PCT Pub. Date: May 11, 2018

(65) Prior Publication Data
US 2019/0263341 A1 Aug. 29, 2019

Related U.S. Application Data

(60) Provisional application No. 62/416,451, filed on Nov. 2, 2016.

(51) Int. Cl.
*B60R 17/02* (2006.01)
*F01M 1/02* (2006.01)
(Continued)

(52) U.S. Cl.
CPC ............... *B60R 17/02* (2013.01); *F01M 1/02* (2013.01); *F01M 1/16* (2013.01);
(Continued)

(58) Field of Classification Search
CPC ......... B60R 17/02; F16N 7/385; F16N 29/02; F01M 1/02; F01M 1/16
(Continued)

(56) References Cited

U.S. PATENT DOCUMENTS 3,659,675 A * 5/1972 Edelstein ............... H01L 23/535
184/7.3
4,787,479 A 11/1988 Ostermeyer et al.
(Continued)

FOREIGN PATENT DOCUMENTS

KR 20150102104 A 9/2015

OTHER PUBLICATIONS

International Preliminary Report on Patentability for International Application No. PCT/US2017/059477 dated May 7, 2019, 11 pages.
(Continued)

Primary Examiner — Michael R Mansen
Assistant Examiner — Mark K Buse
(74) Attorney, Agent, or Firm — Kinney & Lange, P.A.

(57) ABSTRACT

A vehicle lubrication system includes a plurality of sensors disposed on the vehicle and configured to sense operational characteristics of the vehicle, a pump disposed on the vehicle and configured to deliver lubricant to a plurality of lubricated regions of the vehicle, and a controller device operatively coupled to the pump. The controller device is configured to receive sensor data corresponding to the operational characteristics of the vehicle sensed by the plurality of sensors, and determine, based on the received sensor data, a lubricant delivery frequency at which lubrication is to be delivered to the plurality of lubricated regions of the vehicle. The controller device is further configured to provide control commands to cause the pump to deliver the lubricant to the plurality of lubricated regions according to the determined lubricant delivery frequency.

21 Claims, 3 Drawing Sheets

(51) Int. Cl.
*F01M 1/16* (2006.01)
*F16H 57/04* (2010.01)
*F16N 7/38* (2006.01)
*F16N 29/02* (2006.01)

(52) U.S. Cl.
CPC ..... *F16H 57/0446* (2013.01); *F16H 57/0473* (2013.01); *F16N 7/385* (2013.01); *F16N 29/02* (2013.01)

(58) Field of Classification Search
USPC .......................................................... 184/6
See application file for complete search history.

(56) References Cited

U.S. PATENT DOCUMENTS

| | | | | |
|---|---|---|---|---|
| 4,967,881 | A * | 11/1990 | Meuer | F16N 7/385 |
| | | | | 184/7.3 |
| 5,327,347 | A | 7/1994 | Hagenbuch | |
| 5,381,874 | A * | 1/1995 | Hadank | F16N 29/02 |
| | | | | 184/6 |
| 5,417,308 | A * | 5/1995 | Hartl | B62D 53/0885 |
| | | | | 184/7.3 |
| 5,465,810 | A * | 11/1995 | Peterson | F16N 39/00 |
| | | | | 184/6.21 |
| 5,482,138 | A * | 1/1996 | Mori | F16N 29/02 |
| | | | | 184/6 |
| 5,485,895 | A * | 1/1996 | Peterson | C10M 177/00 |
| | | | | 184/104.1 |
| 6,138,065 | A * | 10/2000 | Kramer | F01M 11/10 |
| | | | | 701/33.9 |
| 6,253,601 | B1 | 7/2001 | Wang et al. | |
| 6,370,454 | B1 | 4/2002 | Moore | |
| 6,758,266 | B1 * | 7/2004 | Sjunnesson | B60R 17/02 |
| | | | | 165/253 |
| 6,856,879 | B2 | 2/2005 | Arakawa et al. | |
| 6,959,235 | B1 | 10/2005 | Abdel-Malek et al. | |
| 7,017,712 | B1 * | 3/2006 | Rake | F16N 39/005 |
| | | | | 184/6.4 |
| 7,140,468 | B2 * | 11/2006 | Rake | F16N 29/02 |
| | | | | 184/6.24 |
| 7,286,916 | B2 | 10/2007 | Hoeflacher et al. | |
| 7,483,774 | B2 | 1/2009 | Grichnik et al. | |
| 7,535,347 | B2 | 5/2009 | Larson et al. | |
| 7,706,938 | B2 | 4/2010 | Palladino | |
| 8,131,420 | B2 | 3/2012 | Lynch et al. | |
| 8,196,708 | B2 * | 6/2012 | Kung | F04B 43/06 |
| | | | | 184/29 |
| 8,285,437 | B2 | 10/2012 | Kubota et al. | |
| 8,306,797 | B2 | 11/2012 | Furem et al. | |
| 8,355,836 | B2 | 1/2013 | Silvester | |
| 8,400,296 | B2 | 3/2013 | Brinton et al. | |
| 8,478,477 | B2 | 7/2013 | Maisonneuve et al. | |
| 8,533,018 | B2 | 9/2013 | Miwa et al. | |
| 8,594,883 | B2 * | 11/2013 | Gilbert | G07C 5/008 |
| | | | | 701/33.2 |
| 8,731,766 | B2 | 5/2014 | Artus | |
| 8,739,932 | B2 * | 6/2014 | Ramler | F01M 1/10 |
| | | | | 137/15.01 |
| 8,794,210 | B2 * | 8/2014 | Liimatta | F01M 1/12 |
| | | | | 123/196 R |
| 8,810,385 | B2 | 8/2014 | McQuade et al. | |
| 8,844,680 | B2 * | 9/2014 | Alguera | B60R 17/02 |
| | | | | 184/7.2 |
| 8,849,475 | B1 | 9/2014 | Sudolsky et al. | |
| 9,008,895 | B2 | 4/2015 | Patankar | |
| 2002/0148528 | A1 * | 10/2002 | Matthews | F01M 11/04 |
| | | | | 141/104 |
| 2006/0136105 | A1 | 6/2006 | Larson | |
| 2007/0261922 | A1 * | 11/2007 | Mullen | F16N 39/00 |
| | | | | 184/6.12 |
| 2009/0057063 | A1 * | 3/2009 | Marek | F16N 29/00 |
| | | | | 184/7.4 |
| 2009/0191060 | A1 * | 7/2009 | Bagepalli | F03D 80/70 |
| | | | | 184/6.12 |
| 2010/0147627 | A1 | 6/2010 | Lakomiak et al. | |
| 2010/0321030 | A1 * | 12/2010 | Gale | F04D 15/0088 |
| | | | | 903/902 |
| 2013/0277148 | A1 * | 10/2013 | Beck | F16N 29/02 |
| | | | | 184/7.4 |
| 2013/0336764 | A1 * | 12/2013 | Schmidt | F01M 5/00 |
| | | | | 415/110 |
| 2014/0010668 | A1 * | 1/2014 | Sah | F16H 61/0021 |
| | | | | 903/915 |
| 2014/0048354 | A1 * | 2/2014 | Kolekar | F16H 57/0457 |
| | | | | 184/6.12 |
| 2014/0116808 | A1 * | 5/2014 | Kile | B62D 55/092 |
| | | | | 184/108 |
| 2014/0238742 | A1 * | 8/2014 | Borek | F01M 1/16 |
| | | | | 175/227 |
| 2016/0160713 | A1 * | 6/2016 | Reedy | F16D 13/74 |
| | | | | 184/6.28 |
| 2016/0169448 | A1 * | 6/2016 | Holman | F04B 19/22 |
| | | | | 184/6 |
| 2016/0298755 | A1 * | 10/2016 | Kotsuji | F16H 57/0489 |
| 2018/0371969 | A1 * | 12/2018 | McCormick | F01M 5/001 |
| 2019/0301319 | A1 * | 10/2019 | Uyama | F02N 11/0814 |
| 2021/0402614 | A1 * | 12/2021 | Pavlik | B25J 9/1674 |

OTHER PUBLICATIONS

International Search Report and Written Opinion for International Application No. PCT/US2017/059477 dated Feb. 26, 2018, 15 pages.

* cited by examiner

VEHICLE ADAPTIVE AUTOMATIC LUBRICATION

CROSS-REFERENCE TO RELATED APPLICATION(S)

This application claims priority from U.S. Provisional Application Ser. No. 62/416,451, filed Nov. 2, 2016, and entitled ELECTRIC ON ROAD MOBILE PUMP, which is hereby incorporated by reference in its entirety.

BACKGROUND

This disclosure relates generally to lubrication systems, and more particularly to automatic lubrication systems for vehicles.

Vehicles, such as commercial cargo trucks, construction equipment, buses, and other vehicles often utilize automatic lubrication systems to deliver lubricant to various components and systems of the vehicle, such as bearings, joints, braking systems, steering assemblies, or other lubricated regions of the vehicle. Often, such automatic lubrication systems utilize a controller device that actuates a pump to deliver controlled amounts of lubricant (using, e.g., a lubricant metering device) according to a defined lubrication schedule, such as at every hour of operation of the vehicle.

Lubrication schedules are typically manually programmed via a user interface of the controller, and are often based upon an expected operational use of the vehicle. For instance, because increased turning, braking, shifting, stopping and starting, as well as high temperatures and wet environments can result in increased deterioration and loss of lubricant, higher lubrication frequencies are often utilized when such operational scenarios are expected. In contrast, when expected operation of the vehicle includes fewer stops, starts, braking, shifting, etc., lower lubrication frequencies can be utilized.

Actual operational use of the vehicle, however, may deviate from the expected use. For instance, a particular commercial cargo truck (e.g., within a fleet) that is designated for use in long-haul scenarios, thereby utilizing a relatively low lubrication frequency, may actually be used at any given time for shorter trips including more frequent starts, stops, and gear changes. As such, a low lubrication frequency utilized by the lubrication system (i.e., according to a manually-programmed lubrication schedule) may not adequately meet the lubrication demands of the cargo truck in the operational scenario in which it is actually utilized. Similarly, operational scenarios of vehicles can change between or within working days, thereby decreasing the accuracy of predicted use scenarios and the corresponding lubrication schedules that are programmed into the lubrication system controller. Moreover, because programming of lubrication system controllers to modify lubrication schedules can be cumbersome and time-consuming, such lubrication schedule modifications are often overlooked or otherwise ignored.

Accordingly, typical automatic lubrication systems requiring manual programming of the lubrication schedules may provide lubricant to components at a frequency that does not correspond to actual operational use of the vehicle. As such, the use of manually-programmed automatic lubrication systems can, in certain cases, result in over-lubrication that can increase the build-up of heat within and around components, waste lubricant, and increase labor costs, as well as under-lubrication that can increase component wear, vehicle energy use, and overall operating costs of the vehicle.

SUMMARY

In one example, a vehicle lubrication system includes a plurality of sensors disposed on the vehicle, a pump disposed on the vehicle, and a controller device operatively coupled to the pump. The plurality of sensors are configured to sense operational characteristics of the vehicle. The pump is configured to deliver lubricant to a plurality of lubricated regions of the vehicle. The controller device is configured to receive sensor data corresponding to the operational characteristics of the vehicle sensed by the plurality of sensors, and determine, based on the received sensor data, a lubricant delivery frequency at which lubrication is to be delivered to the plurality of lubricated regions of the vehicle. The controller is further configured to provide control commands to cause the pump to deliver the lubricant to the plurality of lubricated regions according to the determined lubricant delivery frequency.

In another example, a method includes sensing operational characteristics of a vehicle using a plurality of sensors disposed on the vehicle. The method further includes receiving, by a controller device, sensor data corresponding to the operational characteristics of the vehicle sensed by the plurality of sensors, and determining, by the controller device based on the received sensor data, a lubrication schedule defining a frequency of lubricant delivery to a plurality of lubricated regions of the vehicle. The method further includes providing control commands to cause a pump to deliver lubricant to the plurality of lubricated regions according to the lubrication schedule.

DETAILED DESCRIPTION

As described herein, a vehicle lubrication system adaptively determines a lubrication schedule (i.e., a frequency of lubricant delivery) for lubricated regions of the vehicle based on data corresponding to operational characteristics (e.g., vehicle usage characteristics, environmental characteristics, or other operational characteristics) sensed by a plurality of sensors disposed on the vehicle. Such sensors can include, e.g., temperature sensors, accelerometers, rotation sensors, brake actuation and/or wear sensors, speed sensors, pressure sensors, or any other type of sensor disposed on the vehicle and capable of sensing characteristics of the operational use of the vehicle and/or environment within which the vehicle operates. In some examples, the sensors may be disposed on the vehicle and configured to transmit the operational data to, e.g., an engine control module or other electronic control unit of the vehicle over a communications data bus, such as a Controller Area Network (CAN) bus. In such examples, the lubrication system controller can receive the sensor data via the communications data bus and can determine a lubricant delivery frequency based on the received data corresponding to the operational characteristics of the vehicle. Accordingly, a lubrication system implementing techniques of this disclosure can deliver lubricant to components of the vehicle at a frequency that corresponds to the actual operational use of the vehicle, thereby reducing the cost, maintenance efforts, and potential component wear that can result from under-lubrication and over-lubrication of the components.

Figure 1:
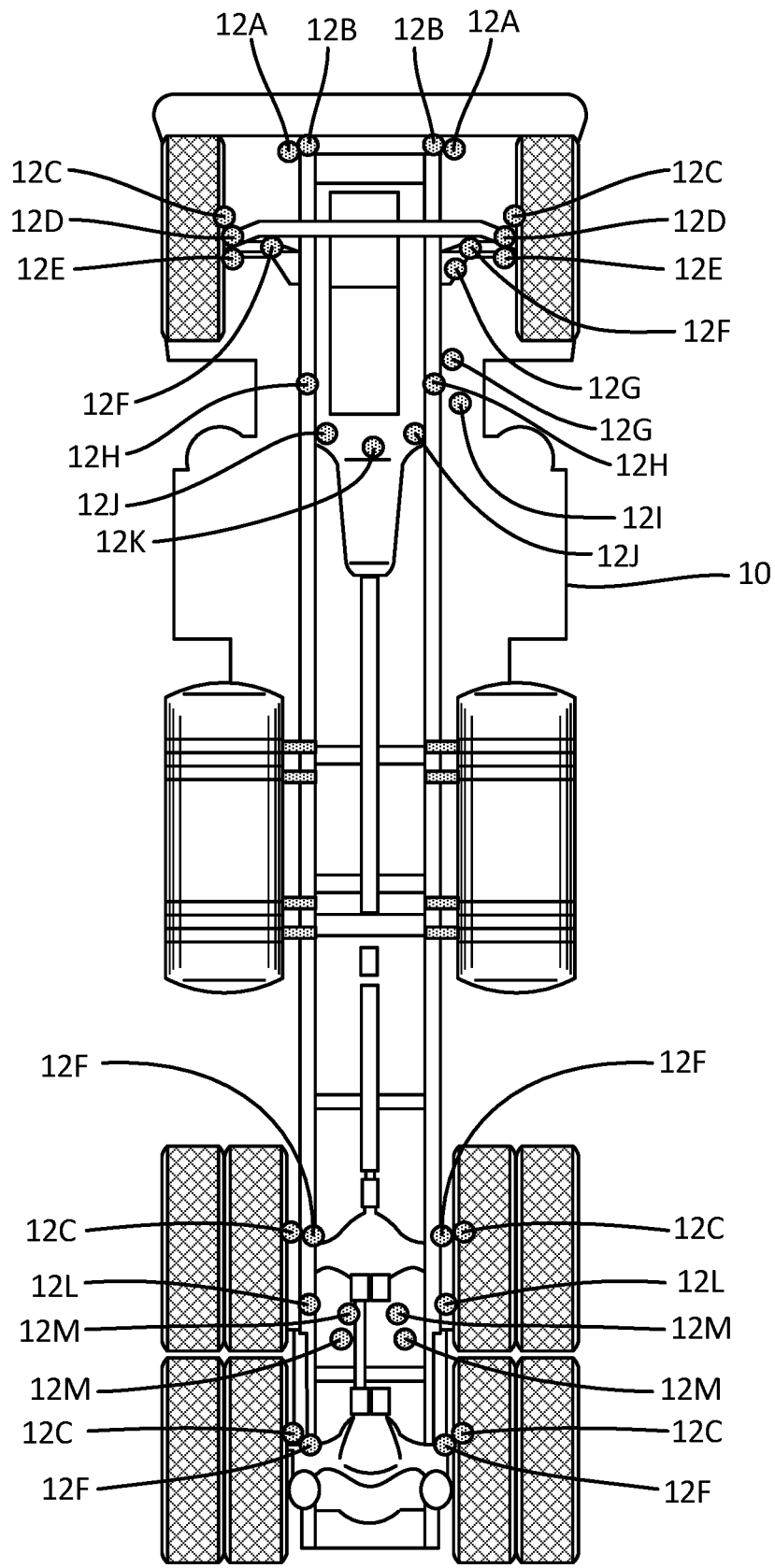
FIG. 1 is a schematic plan view of an underside of a vehicle showing a plurality of lubricated regions.

FIG. 1 is a schematic plan view of an underside of vehicle 10 showing lubricated regions 12A-12M. As illustrated in FIG. 1, vehicle 10 is a commercial cargo truck, though in other examples, vehicle 10 can be, e.g., construction equipment, mining equipment, a bus, or other vehicle or equipment that utilizes an automatic lubrication system to deliver lubricant to various regions and/or components of vehicle 10. Lubricated regions 12A-12M are various regions of vehicle 10 that receive lubrication during vehicle operation. That is, as is further described below, vehicle 10 includes a lubrication system including a pump and controller that delivers lubricant to lubricated regions of vehicle 10, such as lubricated regions 12A-12M.

In the example of FIG. 1, lubricated regions 12A are spring pins of vehicle 10, lubricated regions 12B are hood pins, lubricated regions 12C are S-Cams, lubricated regions 12D are upper and/or lower king pins, lubricated regions 12E are tie rod ends, lubricated regions 12F are slack adjusters, lubricated regions 12G are drag links, lubricated regions 12H are spring hangers, lubricated region 12I is a clutch pedal, lubricated regions 12J are clutch cross shafts, lubricated region 12K is a clutch throw out bearing, lubricated regions 12L are fifth wheel pivots, and lubricated regions 12M are at the fifth wheel plate. Though the example of FIG. 1 illustrates and describes the various lubricated regions 12A-12M, it should be understood that in other examples, vehicle 10 can utilize more lubricated regions, fewer lubricated regions, and/or different lubricated regions than the illustrated lubricated regions 12A-12M. In general, lubricated regions 12A-12M illustrate one example of various lubricated regions of vehicle 10, but other examples can utilize different numbers, types, and/or locations of lubricated regions.

As is further described below, vehicle 10 includes a lubrication system that utilizes various sensors positioned about vehicle 10 that sense data corresponding to operational characteristics of vehicle 10. Operational characteristics can include vehicle usage characteristics corresponding to operational use of vehicle 10 (e.g., steering characteristics, braking characteristics, transmission operational characteristics, load characteristics, component temperature characteristics, or any other operational characteristics associated with operational use of vehicle 10) and/or environmental characteristics corresponding to an operational environment of vehicle 10, such as temperature, the presence and/or amount of liquid water in the operational environment, or any other characteristics of the environment in which vehicle 10 operates.

The lubrication system of vehicle 10, as is further described below, utilizes the data received from the various sensors via, e.g., a Controller Area Network (CAN) bus or other communications data bus to determine a lubricant delivery frequency at which lubrication is to be delivered to lubricated regions 12A-12M during operation of vehicle 10. The lubricant delivery frequency (or schedule) is therefore adaptively determined based on sensed data corresponding to actual operational use, rather than merely an expected use of vehicle 10. Accordingly, the lubrication system of vehicle 10 can deliver lubricant to lubricated regions 12A-12M at a frequency that more closely aligns with the lubrication needs under the actual operating scenario of vehicle 10, thereby reducing the occurrences of under-lubrication and/or over-lubrication of lubricated regions 12A-12M.

Figure 2:
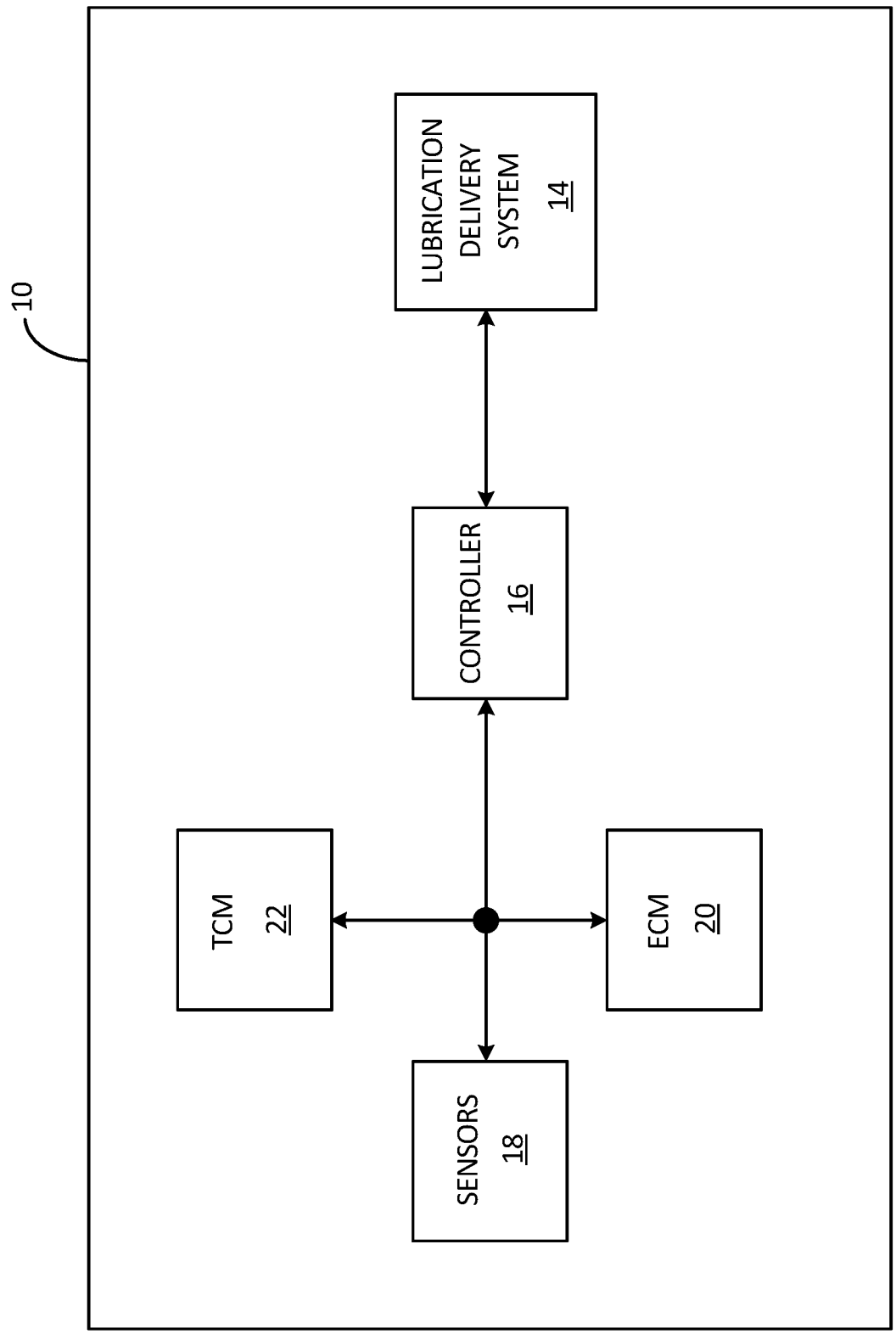
FIG. 2 is a schematic block diagram of a vehicle showing a lubrication delivery system in communication with a controller for automatic lubrication scheduling and delivery.

FIG. 2 is a schematic block diagram of vehicle 10 showing lubrication delivery system 14 in communication with controller 16 for automatic lubrication scheduling and delivery. As illustrated in FIG. 2, lubrication delivery system 14, controller 16, sensors 18, engine control module (ECM) 20, and transmission control module (TCM) 22 are disposed on vehicle 10. Lubrication delivery system 14, as is further described below, includes one or more pumps and metering devices configured to deliver lubricant to lubricated regions of vehicle 10, such as lubricated regions 12A-12M.

Controller 16 is configured to control operation of lubrication delivery system 14 (e.g., a pump of lubrication delivery system 14) to deliver lubricant to lubricated regions at a lubricant delivery schedule determined based on sensed data received from sensors 18, as is further described below. Controller 16 includes one or more processors and computer-readable memory encoded with instructions that, when executed by the one or more processors, cause controller 16 to operate in accordance with techniques described herein. Processor(s) of controller 16 are configured to implement functionality and/or process instructions for execution within controller 16. Examples of processor(s) of controller 16 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory of controller 16 can be configured to store information within controller 16 during operation. Computer-readable memory, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 16 can include volatile and non-volatile storage elements. Examples of volatile storage elements can include random access memories (RAM), dynamic random access memories (DRAM), static random access memories (SRAM), and other forms of volatile memories. Examples of non-volatile storage elements can include magnetic hard discs, optical discs, floppy discs, flash memories, or forms of electrically programmable memories (EPROM) or electrically erasable and programmable (EEPROM) memories.

While illustrated in the example of FIG. 2 as including a single controller device 16, it should be understood that aspects of this disclosure are not so limited. For instance, vehicle 10 can utilize multiple (e.g., two or more) controller devices that distribute functionality attributed herein to controller 16 among the multiple controller devices.

Sensors 18 include, e.g., temperature sensors, accelerometers, rotation sensors, brake actuation and/or wear sensors, speed sensors, pressure sensors, windshield wiper actuation sensors, or any other type of sensor capable of sensing characteristics of the operational use and/or environment within which vehicle 10 operates. Sensors 18 can be disposed at various locations of vehicle 10 to sense operational characteristics of various components of vehicle 10. In some examples, sensors 18 can be disposed at the various locations of vehicle 10 for sensing the operational characteristics and transmitting the sensed data to ECM 20, TCM 22, or other electronic control units of vehicle 10 for operational control of vehicle 10, health and usage management of the components, maintenance and/or fault diagnostics, and/or other operational control and maintenance management of vehicle 10. In certain examples, sensors 18 can be disposed at one or more components of lubrication delivery system 14 (e.g., a pump of lubrication delivery system 14) for use in determining a lubrication delivery schedule at which lubricant is delivered to lubricated regions of vehicle 10.

ECM 20 and TCM 22 are electronic control units that manage operational control of an engine of vehicle 10 (i.e., ECM 20) and a transmission (e.g., an automatic transmission) of vehicle 10 (i.e., TCM 22). For example, ECM 20 can be an electronic control unit that controls actuators, valves, ignition timing, fuel injection, air/fuel ratio, engine running and/or idling speed, or other operational parameters associated with control of the engine of vehicle 10. TCM 22 can be, for example, an electronic control unit that controls when and how to change gears of a transmission of vehicle 10 based on data received from ECM 20 and/or sensors 18 positioned about vehicle 10.

As illustrated in FIG. 2, sensors 18, ECM 20, TCM 22, and controller 16 are communicatively coupled to send and/or receive data via a communications data bus, such as a Controller Area Network (CAN) bus or other communications data bus. In some examples, any one or more of sensors 18, ECM 20, TCM 22, and controller 16 can communicate wirelessly.

ECM 20 and TCM 22 receive data from sensors 18 via the communications data bus for operational control of vehicle 10. Sensors 18, positioned about vehicle 10 and configured to sense data corresponding to operational characteristics of vehicle 10, transmit sensed data on the data bus. Data transmitted by sensors 18 is received by ECM 20 and TCM 22 and utilized for operational control of vehicle 10. ECM 20 and TCM 22 can, in certain examples, transmit data over the communications data bus for use by each other and/or other electronic control modules of vehicle 10. While illustrated and described as including control modules ECM 20 and TCM 22, it should be understood that vehicle 10, in certain examples, can include additional control modules, such as a battery control module or other control modules that can be communicatively coupled with any one or more of sensors 18 and/or controller 16 via the communications data bus. In other examples, vehicle 10 may not include one or more of ECM 20 and TCM 22.

Controller 16, as illustrated in FIG. 2, is communicatively coupled to receive (and, in certain examples, transmit) data via the communications data bus. In operation, controller 16 receives, via the communications data bus, the data sensed by sensors 18. Controller 16 determines and/or adjusts a lubrication schedule (i.e., a lubrication delivery frequency) at which lubricant is to be delivered to lubricated regions 12A-12M (FIG. 1) of vehicle 10 based on the received sensor data corresponding to the operational characteristics of vehicle 10.

Controller 16 can store (e.g., at computer-readable memory of controller 16) information that relates each of the operational characteristics to a target lubrication schedule that defines a frequency of lubricant delivery based on a magnitude and/or state of the functional parameter. Information stored by controller 16 relating each of the operational characteristics to the corresponding target lubrication schedules can take the form of tables (e.g., look-up tables) or other data structures, functional equations, algorithms (e.g., fuzzy logic algorithms, artificial intelligence algorithms, or other algorithms), or any other form that relates the operational characteristics to a target lubrication schedule.

For example, controller 16 can store information that relates an operational characteristic corresponding to a frequency and/or degree of actuation of a steering system of vehicle 10 to a target frequency of lubricant delivery to the lubricated regions of vehicle 10. Increased frequency and/or degree of actuation of the steering system can correspond (e.g., linearly or non-linearly) to an increased target frequency of lubricant delivery. Decreased frequency and/or degree of actuation of the steering system can correspond to a decreased target frequency of lubricant delivery. Similarly, controller 16 can store information that relates each of a plurality of operational characteristics to a corresponding target frequency of lubricant delivery, such as braking characteristics, transmission characteristics, load characteristics, component temperature characteristics, tire pressure characteristics, speed characteristics, mileage characteristics, environmental temperature characteristics, liquid water characteristics, or any other vehicle usage and/or environmental characteristics of vehicle 10.

Braking characteristics indicating an increased frequency and/or degree of actuation of a braking system of vehicle 10 can correspond to an increased target frequency of lubricant delivery. Transmission characteristics indicating an increased frequency and/or degree of actuation of a transmission system of vehicle 10 to change direction of motion or gear ratios of vehicle 10 can correspond to an increased target frequency of lubricant delivery. Load characteristics indicating an increased operational weight of vehicle 10 can correspond to an increased target frequency of lubricant delivery. Component temperature characteristics indicating an increased temperature of one or more components of vehicle 10 can correspond to an increased target frequency of lubricant delivery. Tire pressure characteristics indicating a decreased air pressure within tires of vehicle 10 can correspond to an increased target frequency of lubricant delivery. Speed characteristics indicating an increased speed of vehicle 10 can correspond to an increased target frequency of lubricant delivery. Mileage characteristics indicating an increased distance traveled by vehicle 10 can correspond to an increased target frequency of lubricant delivery. Environmental temperature characteristics indicating an increased temperature of an operational environment of vehicle 10 can correspond to an increased target frequency of lubricant delivery. Liquid water characteristics indicating an increased amount and/or presence of liquid water in the operational environment of vehicle 10 (e.g., rain, submersion, or other presence of liquid water) can correspond to an increased target frequency of lubricant delivery.

Controller 16 determines a lubrication schedule defining a lubrication delivery frequency at which lubricant is to be delivered to lubricated regions 12A-12M (FIG. 1) of vehicle 10 based on the received sensor data corresponding to the operational characteristics of vehicle 10. In some examples, controller 16 determines the lubrication delivery frequency (e.g., once every four hours, once every hour, twice per hour, or other regular or irregular lubrication delivery frequencies) as the greatest (i.e., most frequent) target frequency corresponding to any of the operational characteristics. For instance, controller 16 can determine that braking characteristics of vehicle 10 correspond to a target frequency of lubricant delivery (e.g., once per hour) that is more frequent than any of the other target frequencies corresponding to operational characteristics of vehicle 10. In such an example, controller 16 can determine the lubrication schedule defining a lubrication delivery frequency of once per hour (i.e., corresponding to the target frequency of lubricant delivery associated with the braking characteristics in this example), and can provide control commands to cause lubrication delivery system 14 to deliver lubricant to lubricated regions 12A-12M (FIG. 1) at the determined lubrication delivery frequency of once per hour. Accordingly, controller 16 can determine a lubricant delivery frequency that helps to ensure that none of the systems of vehicle 10 are under-lubricated during operation.

In other examples, controller 16 can determine the lubrication schedule using an average, a weighted average, a mathematical mode, or other central tendency of the plurality of target frequencies corresponding to the associated operational characteristics. For instance, controller 16 can identify a target frequency of lubricant delivery corresponding to each of the operational characteristics of vehicle 10, and can determine the lubrication delivery schedule that is utilized for delivery of lubricant to lubricated regions 12A-12M (FIG. 1) based on a central tendency of each of the identified target frequencies of lubricant delivery. Accordingly, controller 16 can determine and operate according to a lubrication schedule that helps to ensure that each of the lubricated regions of vehicle 10 is provided with lubricant at a frequency that, as a whole, decreases the magnitude of over-lubrication and under-lubrication of the lubricated regions.

As such, a lubrication system implementing techniques of this disclosure can deliver lubricant to components or other lubricated regions of vehicle 10 at a frequency that corresponds to sensed operational characteristics associated with actual use, rather than merely an expected use, of vehicle 10. Accordingly, techniques of this disclosure can reduce the cost, maintenance efforts, and potential component wear and breakdown that can result from under-lubrication and over-lubrication of the components.

Figure 3:
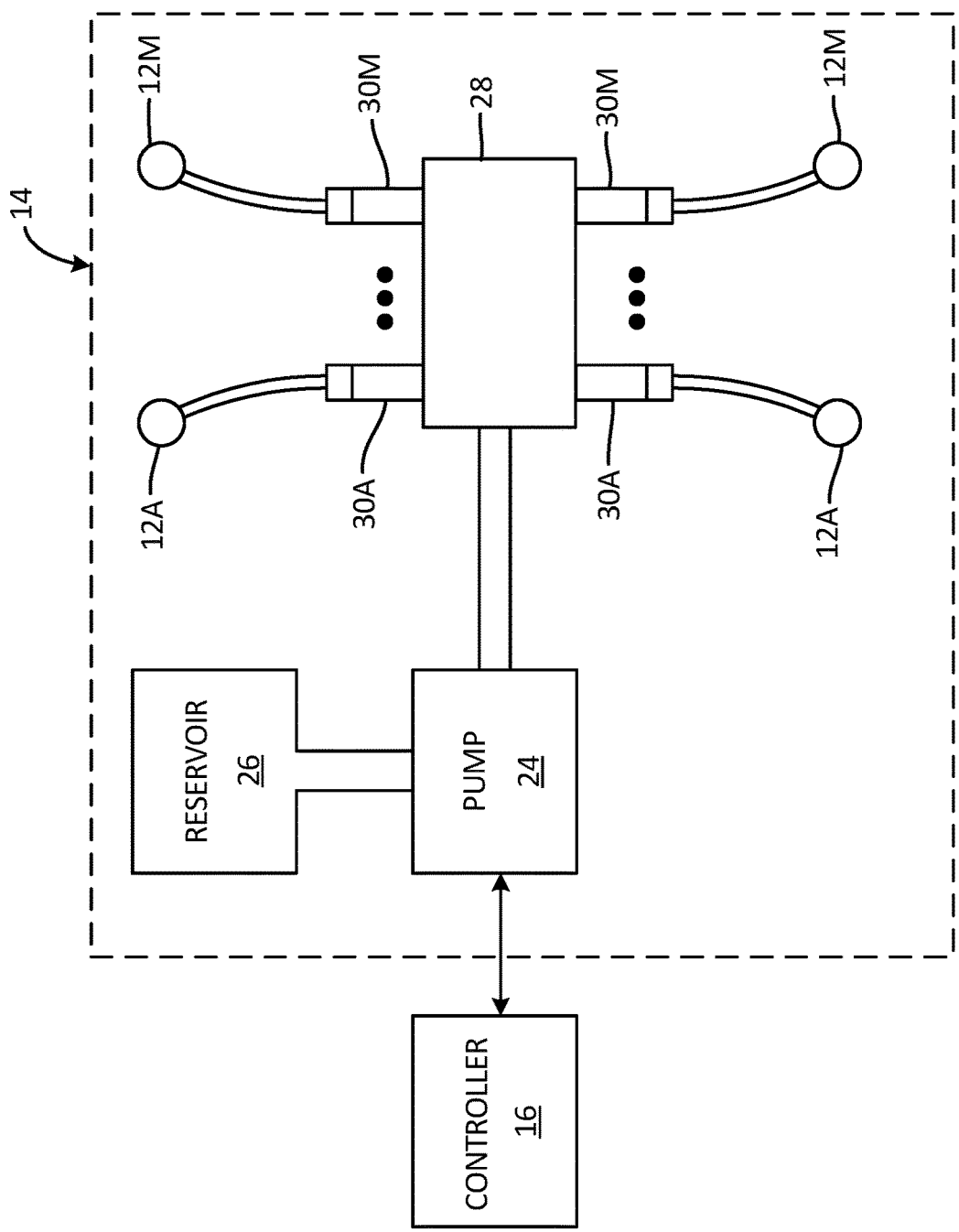
FIG. 3 is a schematic block diagram showing further details of the lubrication delivery system of FIG. 2.

FIG. 3 is a schematic block diagram showing further details of lubrication delivery system 14 of FIG. 2. As illustrated in FIG. 3, lubrication delivery system 14 includes pump 24, lubricant reservoir 26, and lubricant metering device 28. Lubricant metering device 28 includes injectors 30A-30M.

Pump 24 is operatively connected (e.g., electrically and/or communicatively connected) to receive control commands from controller 16. Pump 24 is fluidly connected to each of lubricant reservoir 16 and lubricant metering device 28. Lubricant metering device 28 is fluidly connected to deliver a controlled volume of lubricant to each of lubricated regions 12A-12M via injectors 30A-30M.

Reservoir 26 is configured to store lubricant for delivery to lubricated regions 12A-12M via pump 24 and lubricant metering device 28. Pump 24 can be a positive displacement pump (e.g., a piston pump, a diaphragm pump, or other type of positive displacement pump), a centrifugal pump, or any other type of pump suitable for drawing lubricant from reservoir 26 and delivering the lubricant under pressure to metering device 28. Injectors 30A-30M are each configured (e.g., manually configured) to deliver a defined volume (e.g., same or different defined volumes) of lubricant to a corresponding one of lubricated regions 12A-12M. While illustrated and described as injectors, in other examples, any one or more of injectors 30A-30M can take the form of a divider valve, a piston distributor, or any other device capable of delivering a defined volume of lubricant to a corresponding one of lubricated regions 12A-12M.

In operation, controller 16 provides control commands (e.g., electrical and/or communicative control commands) to pump 24 to cause pump 24 to deliver lubricant to metering device 28 at a determined lubrication delivery schedule. Pump 24, in response to control commands received from controller 16, draws lubricant from reservoir 26 and delivers the lubricant under pressure to metering device 28. Injectors 30A-30M each receive lubricant via metering device 28 and deliver a defined volume of lubricant to a corresponding one of lubricated regions 12A-12M.

Accordingly, controller 16 provides control commands to lubrication delivery system 14 to cause lubricant to be delivered to each of lubricated regions 12A-12M at a lubrication delivery schedule that is adaptively determined based on sensed data corresponding to operational characteristics of vehicle 10. Techniques of this disclosure can therefore help to ensure that lubricant is delivered to lubricated regions 12A-12M at a frequency that corresponds to actual operational use of vehicle 10, thereby reducing the cost, maintenance efforts, and potential component wear that can result from under-lubrication and over-lubrication of the various lubricated regions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vehicle lubrication system comprising:
    a plurality of sensors disposed on the vehicle and configured to sense operational characteristics of the vehicle, the operational characteristics comprising:
        a vehicle usage characteristic corresponding to operational use of the vehicle; and
        an environmental characteristic corresponding to an operational environment external to the vehicle, the environmental characteristic comprising at least one of a temperature of the operational environment in which the vehicle operates and presence of liquid water in the operational environment in which the vehicle operates;
    a pump disposed on the vehicle and configured to deliver lubricant to a plurality of lubricated regions of the vehicle;
    a lubricant metering device connected to the pump and configured to route predetermined volumes of lubricant to each of the plurality of lubricated regions; and
    a controller device operatively coupled to the pump and configured to:
        receive sensor data corresponding to the operational characteristics of the vehicle, including the vehicle usage characteristic and the environmental characteristic, sensed by the plurality of sensors;
        determine, based on the received sensor data, including both the vehicle usage characteristic and the environmental characteristic, a lubricant delivery frequency at which lubrication is to be delivered to the plurality of lubricated regions of the vehicle, wherein the controller is configured to determine lubricant delivery frequency by:

identifying a plurality of target frequencies of lubricant delivery, wherein each target frequency of lubricant delivery corresponds to an operational characteristic of the vehicle; and determining a central tendency of the plurality of target frequencies of lubricant delivery, wherein the central tendency is an average, a weighted average, or a mathematical mode;

wherein the lubricant delivery frequency determined is based on the central tendency of the plurality of target frequencies of lubricant delivery; and provide control commands to cause the pump to deliver the lubricant to the plurality of lubricated regions according to the determined lubricant delivery frequency.

2. The vehicle lubrication system of claim 1, wherein the controller device is configured to receive the sensor data via a communications data bus disposed on the vehicle.

3. The vehicle lubrication system of claim 2, wherein the communications data bus comprises a Controller Area Network (CAN) bus.

4. The vehicle lubrication system of claim 1, wherein the controller device is configured to receive the sensor data via wireless data transmissions.

5. The vehicle lubrication system of claim 1, wherein the operational characteristics of the vehicle comprise a plurality of vehicle usage characteristics including at least two of steering characteristics associated with actuation of a steering system of the vehicle, braking characteristics associated with actuation of a braking system of the vehicle, transmission characteristics associated with actuation of a transmission system to change direction of motion or gear ratios of the vehicle, load characteristics associated with an operational weight of the vehicle, component temperature characteristics associated with temperature of a component of the vehicle, tire pressure characteristics associated with air pressure within tires of the vehicle, speed characteristics associated with a speed of the vehicle, and mileage characteristics associated with a distance traveled by the vehicle.

6. The vehicle lubrication system of claim 1, wherein the controller device is further configured to:
receive the sensor data corresponding to the operational characteristics of the vehicle data during operation of the vehicle;
adjust the lubricant delivery frequency during operation of the vehicle based on the received sensor data; and
provide the control commands to cause the pump to deliver the lubricant to the plurality of lubricated regions according to the adjusted lubricant delivery frequency.

7. The vehicle lubrication system of claim 1, wherein the plurality of lubricated regions of the vehicle includes a plurality of regions selected from the group of regions consisting of hood pins, S-Cams, upper and/or lower king pins, tie rod ends, slack adjusters, drag links, spring hangers, clutch pedal, clutch cross shafts, clutch throw out bearing, fifth wheel pivots, and fifth wheel plat.

8. A method comprising:
sensing operational characteristics of a vehicle using a plurality of sensors disposed on the vehicle, the operational characteristics comprising:
a vehicle usage characteristic corresponding to operational use of the vehicle; and
an environmental characteristic corresponding to an operational environment external to the vehicle, the environmental characteristic comprising at least one of a temperature of the operational environment in which the vehicle operates and presence of liquid water in the operational environment in which the vehicle operates;

receiving, by a controller device, sensor data corresponding to the operational characteristics of the vehicle, including the vehicle usage characteristic and the environmental characteristic, sensed by the plurality of sensors;

determining, by the controller device based on the received sensor data, including both the vehicle usage characteristic and the environmental characteristic, a lubrication schedule defining a frequency of lubricant delivery to a plurality of lubricated regions of the vehicle; the lubrication schedule determined by:
identifying a plurality of target frequencies of lubricant delivery, wherein each target frequency of lubricant delivery corresponds to an operational characteristic of the vehicle; and
determining a central tendency of the plurality of target frequencies of lubricant delivery, wherein the central tendency is an average, a weighted average, or a mathematical mode;
wherein the lubricant delivery frequency determined is based on the central tendency of the plurality of target frequencies of lubricant delivery;

providing control commands to cause a pump to deliver lubricant to the plurality of lubricated regions according to the lubrication schedule;

delivering the lubricant from the pump to a metering device; and routing, by the metering device, predetermined volumes of the lubricant to each of the plurality of lubricated regions.

9. The method of claim 8, wherein receiving the sensor data comprises receiving, by the controller device, the sensor data via a communications data bus disposed on the vehicle.

10. The method of claim 8, wherein receiving the sensor data comprises receiving, by the controller device, the sensor data via wireless data transmissions.

11. The method of claim 8, wherein the sensed operational characteristics of the vehicle comprise a plurality of vehicle usage characteristics including a plurality of vehicle usage characteristics including at least two of steering characteristics associated with actuation of a steering system of the vehicle, braking characteristics associated with actuation of a braking system of the vehicle, transmission characteristics associated with actuation of a transmission system to change direction of motion or gear ratios of the vehicle, load characteristics associated with an operational weight of the vehicle, tire pressure characteristics associated with air pressure within tires of the vehicle, speed characteristics associated with a speed of the vehicle, and mileage characteristics associated with a distance traveled by the vehicle.

12. The method of claim 8, further comprising:
adjusting, by the controller device, the lubrication schedule during operation of the vehicle based on the received sensor data corresponding to the operational characteristics of the vehicle; and providing the control commands to cause the pump to deliver the lubricant to the plurality of lubricated regions according to the adjusted lubrication schedule.

13. The method of claim 8, wherein the plurality of lubricated regions of the vehicle is external to the engine and transmission.

14. The method of claim 13, wherein the plurality of lubricated regions of the vehicle includes a plurality of regions selected from the group of regions consisting of hood pins, S-Cams, upper and/or lower king pins, tie rod ends, slack adjusters, drag links, spring hangers, clutch pedal, clutch cross shafts, clutch throw out bearing, fifth wheel pivots, and fifth wheel plat.

15. A vehicle lubrication system for components of the vehicle exterior to an engine and a transmission of the vehicle, the vehicle lubrication system comprising:
a plurality of sensors disposed on the vehicle, the plurality of sensors disposed at a plurality of locations of the vehicle and configured to sense a plurality of operational characteristics of the vehicle;
a pump disposed on the vehicle and configured to periodically deliver lubricant to a plurality of lubricated regions of the vehicle;
a lubricant metering device connected to the pump and configured to route predetermined volumes of lubricant to each of the plurality of lubricated regions through hoses disposed between the lubricant metering device and the plurality of lubricated regions, the volumes of lubricant consumed during operation of the vehicle; and
a controller device operatively coupled to the pump and configured to:
receive sensor data corresponding to the plurality of operational characteristics of the vehicle sensed by the plurality of sensors;
determine, based on the received sensor data, a lubricant delivery frequency at which lubrication is to be delivered to the plurality of lubricated regions of the vehicle, wherein the controller is configured to determine lubricant delivery frequency by:
identifying a plurality of target frequencies of lubricant delivery, wherein each target frequency of lubricant delivery corresponds to an operational characteristic of the vehicle; and
determining a central tendency of the plurality of target frequencies of lubricant delivery, wherein the central tendency is an average, a weighted average, or a mathematical mode;
wherein the lubricant delivery frequency determined is based on the central tendency of the plurality of target frequencies of lubricant delivery; and
provide control commands to cause the pump to deliver the lubricant to the plurality of lubricated regions according to the determined lubricant delivery frequency.

16. The vehicle lubrication system of claim 15, wherein the plurality of lubricated regions of the vehicle includes a plurality of regions selected from the group of regions consisting of hood pins, S-Cams, upper and/or lower king pins, tie rod ends, slack adjusters, drag links, spring hangers, clutch pedal, clutch cross shafts, clutch throw out bearing, fifth wheel pivots, and fifth wheel plat.

17. The vehicle lubrication system of claim 15, wherein the operational characteristics comprise:
a vehicle usage characteristic corresponding to operational use of the vehicle; and
an environmental characteristic corresponding to an operational environment external to the vehicle, the environmental characteristic comprising at least one of a temperature of the operational environment in which the vehicle operates and presence of liquid water in the operational environment in which the vehicle operates.

18. The vehicle lubrication system of claim 15, wherein the controller device is further configured to:
adjust the lubricant delivery frequency during operation of the vehicle based on the received data corresponding to the operational characteristics of the vehicle; and
provide the control commands to cause the pump to deliver the lubricant to the plurality of lubricated regions according to the adjusted lubricant delivery frequency.

19. A vehicle lubrication system comprising:
a plurality of sensors disposed on the vehicle and configured to sense operational characteristics of the vehicle, the operational characteristics comprising:
a vehicle usage characteristic corresponding to operational use of the vehicle; and
an environmental characteristic corresponding to an operational environment external to the vehicle, the environmental characteristic comprising at least one of a temperature of the operational environment in which the vehicle operates and presence of liquid water in the operational environment in which the vehicle operates;
a pump disposed on the vehicle and configured to deliver lubricant to a plurality of lubricated regions of the vehicle;
a lubricant metering device connected to the pump and configured to route predetermined volumes of lubricant to each of the plurality of lubricated regions; and
a controller device operatively coupled to the pump and configured to:
receive sensor data corresponding to the operational characteristics of the vehicle, including the vehicle usage characteristic and the environmental characteristic, sensed by the plurality of sensors;
determine, based on the received sensor data, including both the vehicle usage characteristic and the environmental characteristic, a lubricant delivery frequency at which lubrication is to be delivered to the plurality of lubricated regions of the vehicle, wherein the controller is configured to determine lubricant delivery frequency by:
identifying a plurality of target frequencies of lubricant delivery, wherein each target frequency of lubricant delivery corresponds to an operational characteristic of the vehicle; and
determining the lubricant delivery frequency based on the greatest of the plurality of target frequencies of lubricant delivery, wherein the greatest of the plurality of target frequencies corresponds to the most frequent lubrication delivery; and
provide control commands to cause the pump to deliver the lubricant to the plurality of lubricated regions according to the determined lubricant delivery frequency.

20. A method comprising:
sensing operational characteristics of a vehicle using a plurality of sensors disposed on the vehicle, the operational characteristics comprising:
a vehicle usage characteristic corresponding to operational use of the vehicle; and an environmental characteristic corresponding to an operational environment external to the vehicle, the environmental characteristic comprising at least one of a temperature of the operational environment in which the vehicle operates and presence of liquid water in the operational environment in which the vehicle operates;

receiving, by a controller device, sensor data corresponding to the operational characteristics of the vehicle, including the vehicle usage characteristic and the environmental characteristic, sensed by the plurality of sensors;

determining, by the controller device based on the received sensor data, including both the vehicle usage characteristic and the environmental characteristic, a lubrication schedule defining a frequency of lubricant delivery to a plurality of lubricated regions of the vehicle; the lubrication schedule determined by:

identifying a plurality of target frequencies of lubricant delivery, wherein each target frequency of lubricant delivery corresponds to an operational characteristic of the vehicle; and determining the lubricant delivery frequency based on the greatest of the plurality of target frequencies of lubricant delivery, wherein the greatest of the plurality of target frequencies corresponds to the most frequent lubrication delivery;

providing control commands to cause a pump to deliver lubricant to the plurality of lubricated regions according to the lubrication schedule;

delivering the lubricant from the pump to a metering device; and routing, by the metering device, predetermined volumes of the lubricant to each of the plurality of lubricated regions.

21. A vehicle lubrication system for components of the vehicle exterior to an engine and a transmission of the vehicle, the vehicle lubrication system comprising:

a plurality of sensors disposed on the vehicle, the plurality of sensors disposed at a plurality of locations of the vehicle and configured to sense a plurality of operational characteristics of the vehicle;

a pump disposed on the vehicle and configured to periodically deliver lubricant to a plurality of lubricated regions of the vehicle;

a lubricant metering device connected to the pump and configured to route predetermined volumes of lubricant to each of the plurality of lubricated regions through hoses disposed between the lubricant metering device and the plurality of lubricated regions, the volumes of lubricant consumed during operation of the vehicle; and a controller device operatively coupled to the pump and configured to:

receive sensor data corresponding to the plurality of operational characteristics of the vehicle sensed by the plurality of sensors;

determine, based on the received sensor data, a lubricant delivery frequency at which lubrication is to be delivered to the plurality of lubricated regions of the vehicle, wherein the controller is configured to determine lubricant delivery frequency by:

identifying a plurality of target frequencies of lubricant delivery, wherein each target frequency of lubricant delivery corresponds to an operational characteristic of the vehicle; and determining the lubricant delivery frequency based on the greatest of the plurality of target frequencies of lubricant delivery, wherein the greatest of the plurality of target frequencies corresponds to the most frequent lubrication delivery; and provide control commands to cause the pump to deliver the lubricant to the plurality of lubricated regions according to the determined lubricant delivery frequency.

* * * * *